S. T. PULLIAM.
COMBINATION STERILIZER.
APPLICATION FILED MAR. 22, 1910.
982,528.
Patented Jan. 24, 1911.
2 SHEETS—SHEET 2.
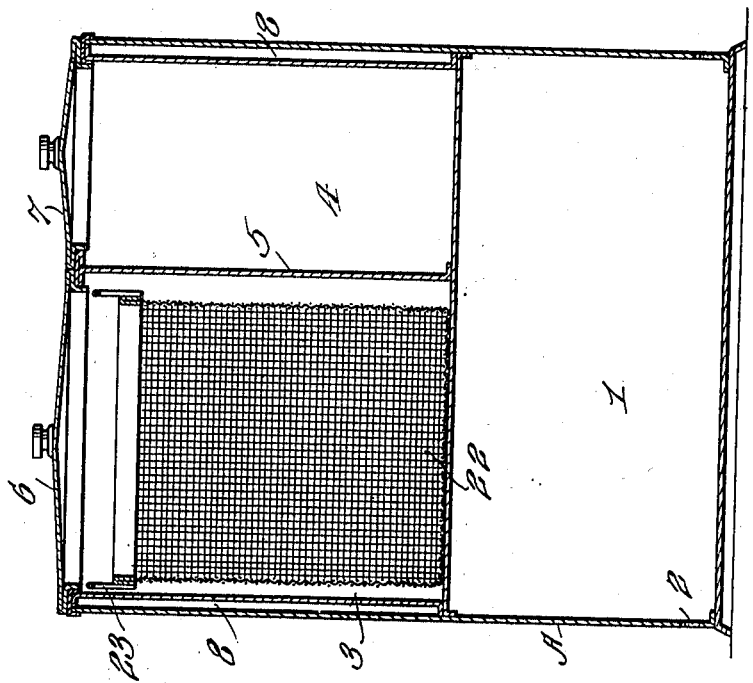
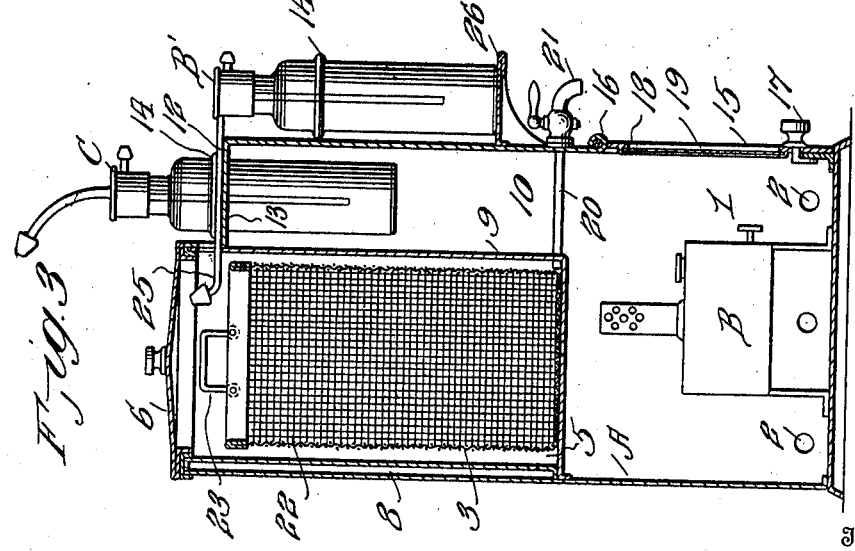
Witnesses
Frank Hough
C. Bradway.
Inventor
Seeley T. Pulliam,
By Victor J. Evans
Attorney

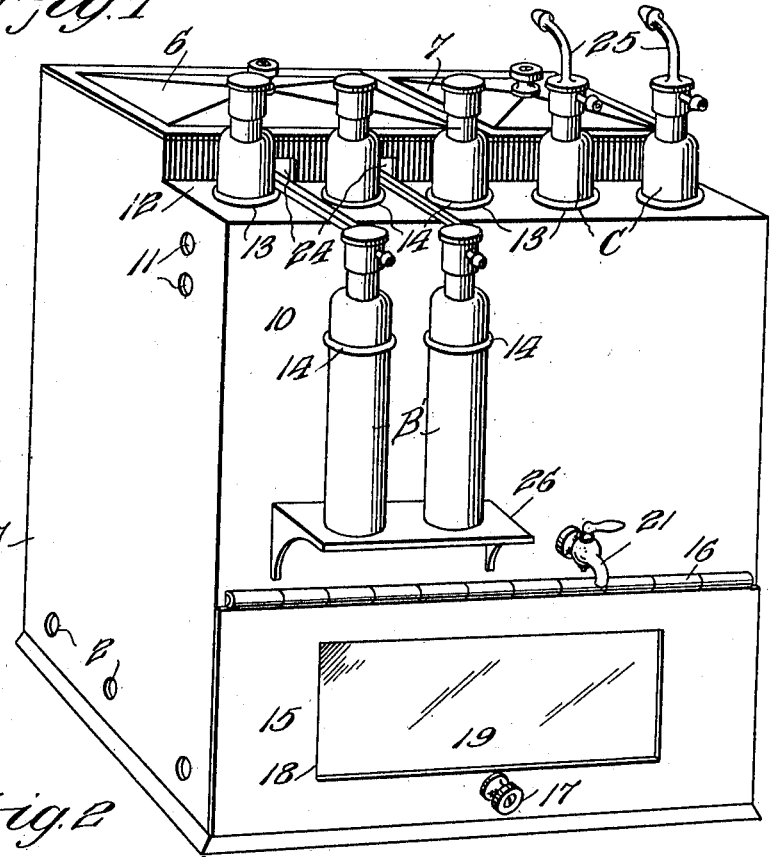

UNITED STATES PATENT OFFICE.

SEELEY T. PULLIAM, OF CROWLEY, LOUISIANA.

COMBINATION-STERILIZER.

982,528.  Specification of Letters Patent.  Patented Jan. 24, 1911.

Application filed March 22, 1910. Serial No. 550,924.

*To all whom it may concern:*

Be it known that I, SEELEY T. PULLIAM, citizen of the United States, residing at Crowley, in the parish of Acadia and State of Louisiana, have invented new and useful Improvements in Combination - Sterilizers, of which the following is a specification.

This invention relates to a sterilizing apparatus designed more especially for use by ear, nose and throat specialists and the principal object of the invention is to combine in a single apparatus means for sterilizing surgical instruments, heating atomizer solutions in their containing bottles and sterilizing the tips of the atomizers and heating a reservoir containing water.

Another object of the invention is to provide a device of this character which is of comparatively simple and inexpensive construction, reliable and efficient in use, and of such design that a single burner may be employed for heating the sterilizing chamber and water reservoir as well as heating the atomizer solutions.

With these objects in view and others as will appear as the description proceeds the invention comprises the various novel features of construction and arrangement of parts which will be more fully described hereinafter and set forth with particularity in the claims appended hereto.

In the accompanying drawing which illustrates one embodiment of the invention: Figure 1 is a perspective view of the apparatus. Fig. 2 is a plan view thereof. Fig. 3 is a vertical section on line 3—3, Fig. 2. Fig. 4 is a vertical section on line 4—4, Fig. 2.

Similar reference characters are employed to designate corresponding parts throughout the several views.

Referring to the drawing A designates the casing of the apparatus which is preferably made of sheet metal and is of rectangular box-like form. In the bottom of the casing is a heating chamber 1 which contains an alcohol, kerosene, electric or other heater, there being air admitting openings 2 in the side walls of the burner chamber 1 for supporting combustion. Over the burner B are sterilizing and water compartments 3 and 4 respectively which are divided by a wall 5 consisting of a single sheet of metal so that heat can pass from one compartment to the other, both compartments being open at the top and normally closed by separate covers 6 and 7 respectively. The side and rear walls of these compartments 3 and 4 are double so as to provide an air space 8 which reduces to a minimum loss of heat by radiation to the atmosphere, but the front walls of the compartments consist of a single sheet of metal 9 since in front of such walls is a heating chamber 10 extending from one side of the casing A to the other and between the front wall of the casing and front walls of the compartments 3 and 4, the compartment 10 being open at its bottom to communicate with the burner chamber 1 and having draft openings 11 in its sides so that the heated air can pass through the chamber 10. This chamber 10 forms a heating compartment for bottles that contain the atomizing solutions which are to be heated before being used in a treatment and in the top 12 of the chamber 10 are openings 13 for receiving the atomizer bottles C and these bottles are supported by their annular flanges 14 resting on the top 12 of the compartment 10.

The front of the casing A has an opening extending across the front thereof at the bottom and this is closed by a door 15 hinged at its top edge 16 to the front of the casing so as to swing forwardly and upwardly during its opening movement, the door being provided with a knob 17 and having an opening 18 provided with mica or other transparent plate 19 so that the burner can be readily observed and by means of the door access can be had to the burner for lighting the same or adjusting the flame thereof. The water reservoir or compartment 4 is provided with a pipe 20 in its bottom which extends out of the front of the casing and terminates in a faucet 21 whereby water can be drawn from the reservoir when desired. In the sterilizing compartment 3 is a basket 22 made of wire netting or equivalent material to hold the surgical instruments while they are being sterilized and this basket is provided with handles 23 for facilitating the insertion or. removal of the basket.

It is desirable to sterilize the tips of certain atomizers and for this purpose those atomizers required for immediate use can be supported with their tips disposed in the sterilizing chamber and for this purpose the front wall of the sterilizer has openings 24 through which the tubes 25 of the atomizers are inserted while the latter rest on a shelf 26 secured to the front of the casing A at such a point that the tops of the atomizers C will be disposed at the top 12 of the compartment 10, which top is set below the top of the sterilizing compartment. The openings 24 are disposed in such a position that the tubes 25 of the atomizers whose tips are being sterilized can pass between adjacent atomizer bottles C in the openings 13 that contain solutions to be treated so that with the present construction five atomizers can be heating, while two are having their tips sterilized.

With a sterilizing apparatus of this character the surgical instruments and atomizers can be kept in a highly antiseptic condition while the solutions are kept heated and yet the arrangement is such that the physician can carry on his operations with convenience and despatch. Furthermore, the design of the apparatus is such that after the apparatus has become thoroughly heated, the flame can be reduced without the temperature falling perceptibly, since the sterilizing and reservoir compartments will remain heated for a long time.

The apparatus is compact, neat in appearance and can be placed on a bracket or stand within easy reach of the operator.

From the foregoing description taken in connection with the accompanying drawing the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative and that such changes may be made when desired as are within the scope of the claims.

What is claimed is—

1. An apparatus of the class described comprising a casing having a heating chamber in its bottom, a sterilizing chamber above the heating chamber, a water reservoir chamber above the heating chamber, an atomizer heating chamber in open communication with the heating chamber and having openings in which atomizers can be supported, said sterilizing chamber having openings in its wall for receiving atomizer tips, and means supported on and disposed exterior to the casing and located below the last-mentioned openings to form a rest on which the bottoms of atomizers can be supported in a position that their tips will extend into the sterilizing chamber through the openings thereof.

2. An apparatus of the class described, comprising a casing, a heater therein, a sterilizing compartment in the casing, an atomizer heating chamber in the casing and through which air heated by the heater circulates, means for supporting atomizers in the said heating chamber, and a horizontal shelf for supporting atomizers outside the heating chamber and sterilizer with their tips disposed within the latter.

3. An apparatus of the class described comprising a casing having a heating chamber at its bottom provided with air inlet openings, a chamber in open communication with the heating chamber and provided with draft openings and with openings for receiving atomizer bottles, a sterilizing chamber in the casing, and a shelf secured to the casing for supporting an atomizer with its tip extending into the sterilizing chamber.

4. An apparatus of the class described comprising a casing having a heating chamber, separate sterilizing and water compartments in the casing, an atomizer heating compartment in the casing and extending along the first-mentioned compartments and in open communication with the heating chamber, said atomizer heating compartment being provided with openings in its top for receiving a plurality of atomizer bottles, and means for supporting additional atomizers with their tubes extending between the atomizer bottles in the atomizer heating compartment and their tips extending into the sterilizing compartment.

5. An apparatus of the class described comprising a casing, a burner chamber therein, an atomizer heating chamber communicating therewith and having openings in its top for receiving atomizer bottles, a sterilizing chamber in the casing having a wall extending above the top of the atomizer heating chamber, said wall being provided with openings offset from the adjacent openings in the atomizer heating chamber, and means secured to the outside of the casing for supporting atomizers in a position that their tips can extend into the sterilizing chamber through the openings thereof.

In testimony whereof I affix my signature in presence of two witnesses.

SEELEY T. PULLIAM.

Witnesses:
L. J. W. BREAUX,
CHAS. H. BLISH.